United States Patent [19]

Degrassi et al.

[11] Patent Number: 5,547,765
[45] Date of Patent: Aug. 20, 1996

[54] RETORTABLE POLYMERIC FILMS

[75] Inventors: Alfieri Degrassi, Schuylkill, Pa.;
William W. Furrer, Morris, N.J.

[73] Assignee: AlliedSignal Inc., Morris Township, N.J.

[21] Appl. No.: 217,823

[22] Filed: Mar. 25, 1994

Related U.S. Application Data

[63] Continuation-in-part of Ser. No. 116,624, Sep. 7, 1993, abandoned.

[51] Int. Cl.[6] .................................................... B32B 27/34
[52] U.S. Cl. ................................... 428/474.7; 428/474.9; 428/475.5
[58] Field of Search ............................. 428/475.5, 474.9, 428/474.7

[56] References Cited

U.S. PATENT DOCUMENTS

| | | | |
|---|---|---|---|
| 3,510,464 | 5/1970 | Sato | 260/87.3 |
| 3,560,461 | 2/1971 | Yonezu et al. | 260/87.3 |
| 3,585,177 | 6/1971 | Gardner et al. | 260/87.3 |
| 3,595,740 | 7/1971 | Gerow | 161/254 |
| 3,847,845 | 11/1974 | Tada et al. | 260/2.5 M |
| 3,949,114 | 4/1976 | Viola et al. | 428/337 |
| 4,058,647 | 11/1977 | Inoue et al. | 428/474 |
| 4,254,169 | 3/1981 | Schroeder | 428/35 |
| 4,284,674 | 8/1981 | Sheptak | 428/69 |
| 4,362,385 | 12/1982 | Lobach | 355/77 |
| 4,501,798 | 2/1985 | Koschak et al. | 428/349 |
| 4,908,272 | 3/1990 | Harada et al. | 428/412 |
| 5,032,656 | 7/1991 | Mares et al. | 526/255 |
| 5,055,355 | 10/1991 | DeAntonis et al. | 428/476.3 |
| 5,110,855 | 5/1992 | Blatz | 524/441 |
| 5,281,360 | 1/1994 | Hong et al. | 252/188.28 |

FOREIGN PATENT DOCUMENTS

| | | |
|---|---|---|
| 236099A3 | 9/1987 | European Pat. Off. . |
| 309095A1 | 3/1989 | European Pat. Off. . |
| 527237A1 | 2/1993 | European Pat. Off. . |
| 530549A1 | 3/1993 | European Pat. Off. . |

OTHER PUBLICATIONS

"Trends and Equipment... Coextrusion", M. H. Naitove, Plastics Tech,. Feb. 1977, pp. 61–71.
"Modern Plastics Encyclopedia", vol. 56, No. 10A, Oct. 1979, (McGraw–Hill) pp. 131–132.
English Abstract to JP to 4,270,655 (English Abstract 1992).
JP 3,146,343 (English Abstract 1991).

*Primary Examiner*—D. S. Nakarani
*Attorney, Agent, or Firm*—Michele G. Mangini

[57] ABSTRACT

A polymeric film having superior oxygen barrier properties comprising at least three layers, two layers formed of an aliphatic polyamide such as poly(caprolactam) sandwiching a layer formed of an aliphatic/aromatic polyamide such as poly(m-xylylene adipamide) or a blend of an aliphatic/aromatic polyamide such as poly(m-xylylene adipamide) with an ethylene vinyl alcohol copolymer.

20 Claims, 1 Drawing Sheet

RETORTABLE POLYMERIC FILMS

CROSS-REFERENCE TO RELATED APPLICATIONS

This application is a continuation-in-part of application Ser. No. 08/116,624 filed Sep. 7, 1993 (abandoned).

BACKGROUND OF THE INVENTION

1. Field of the Invention

The present invention relates to polymeric films. More particularly, this invention relates to polymeric films having improved mechanical and gas barrier properties and capable of withstanding retorting.

2. Description of the Prior Art

It is known in the art that polyolefin films, such as polyethylene and polypropylene, are common packaging materials because of their relatively high moisture resistance. However, these polyolefins also have a fairly high permeability to gases, including oxygen, so that if used alone, they are inadequate for packaging oxygen sensitive materials, such as food.

By contrast, polymers and copolymers of vinyl alcohol, such as those of polyvinyl alcohol and ethylene vinyl alcohol, have excellent resistance to gas permeation. However, both ethylene vinyl alcohol and polyvinyl alcohol films tend to lose this desirable property in the presence of moisture. Further, if the vinyl alcohol film is either exposed to high temperatures, such as approximately 240° C. and above, or prolonged heat exposure, the film will form gels and decompose.

It is desirable to sandwich the substantially pure ethylene vinyl alcohol and polyvinyl alcohol compounds between polyolefin layers, but such compounds do not bond well to many polymer films. Furthermore, as the pure vinyl alcohol content of the interior layer is decreased by blending it with other polymers, its oxygen barrier properties likewise fall.

Also commonly used as a component in packaging films are polyamide polymers and copolymers.

Examples of such prior art films are described in U.S. Pat. Nos. 4,254,169; 3,595,740; and 5,055,355.

Another characteristic important to film laminates suitable for packaging materials is the ability to withstand the combination of heat and flexing to which it is often subjected during processes such as pasteurization or sterilization. However, many of the known laminates containing oxygen barrier layers are wholly unsuitable for such procedures in which they are subjected to temperatures between approximately 80° C. to approximately 130° C. As a result of their low softening points, these known barrier laminates are unable to maintain their structural integrity. Other laminates which employ aluminum foil as the barrier component tend to develop pinholes during such procedures, thereby also rendering them unsuitable for such use since such pinholes cause a serious increase in oxygen permeability. Although this tendency can be controlled by sandwiching the foil between two biaxially oriented films, such laminates are inconvenient and costly to produce, and cannot be thermoformed.

It would be desirable to provide a film which has improved mechanical and gas barrier properties and which is capable of withstanding retorting conditions (e.g., temperatures in the range of about 119° C. to 123° C.).

SUMMARY OF THE INVENTION

In accordance with this invention, there is provided a retortable film having at least three layers comprised of:
a) two aliphatic polyamide layers; and
b) an interior layer selected from the group consisting of an aliphatic/aromatic polyamide and a blend of an aliphatic/aromatic polyamide and an ethylene vinyl alcohol copolymer, wherein said interior layer is positioned between said two aliphatic polyamide layers.

Illustrative of the aliphatic/aromatic polyamides suitable for the interior layer are those having recurring units of the formula:

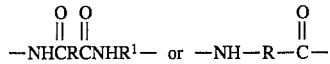

or a combination thereof, in which R and $R^1$ are either the same or different and are alkylene groups of at least about two carbon atoms, preferably between about 2 to about 12 carbon atoms. Preferably, the aliphatic/aromatic polyamide of the interior layer may be further blended with ethylene vinyl alcohol.

The film of this invention exhibits one or more beneficial properties. Not only do the films exhibit excellent physical and oxygen barrier properties, but they also exhibit enhanced heat resistant properties to withstand the rigors of retorting conditions. Because the films of this invention possess the combination of these properties, they are especially suited for use in goods packaging applications.

BRIEF DESCRIPTION OF THE DRAWINGS

The invention will be more fully understood and further advantages will become apparent when reference is made to the following detailed description of the invention and accompanying drawings in which.

DESCRIPTION OF THE PREFERRED EMBODIMENTS

The preferred embodiments of this invention will be better understood by those of skill in the art by reference to the above figures.

Figure 1:
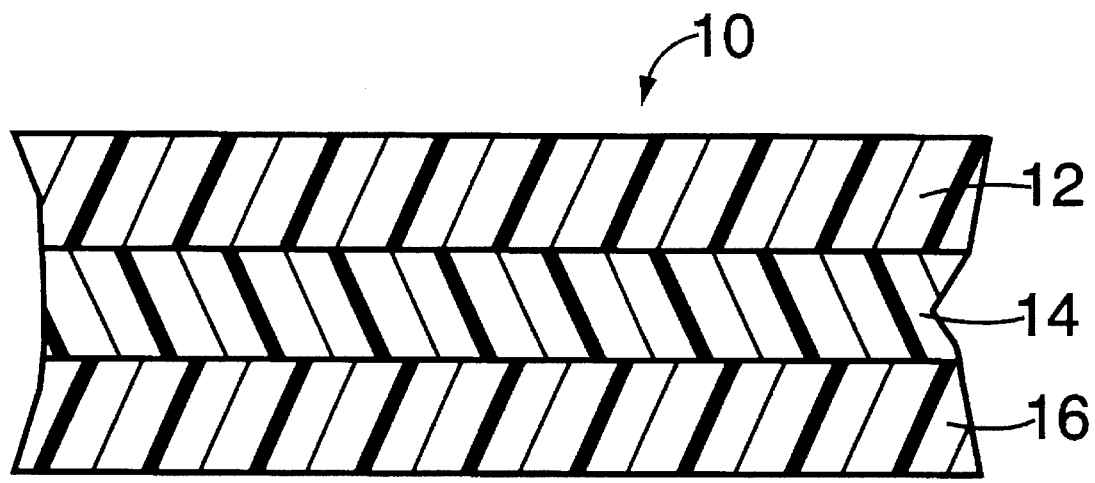
FIG. 1 is a cross-sectional view of a preferred structure of this invention having three co-extruded layers.

The basic form of the invention is shown by the co-extruded film of FIG. 1, which is generally designated 10. Film 10 has three essential layers 12, 14 and 16. Layers 12 and 16 are formed from an aliphatic polyamide and layer 14 is formed from an aliphatic/aromatic polyamide. The film of this invention is not limited to the three essential layers 12, 14 and 16 provided that layer 14 is positioned between layers 12 and 16. Thus, the film of this invention may include any number of additional layers in any position as, for example, the addition of other polymeric film layers, and/or adhesive or tie layers. In the preferred embodiment of the invention, the films include only three essential layers 12, 14 and 16.

Layers 12 and 16 are formed from an "aliphatic polyamide". As used herein, "aliphatic polyamides" are polyamides characterized by the presence of recurring carbon-amide groups as an integral part of the polymer chain which are separated from one another by at least two aliphatic carbon atoms. Illustrative of these polyamides are those having recurring monomeric units represented by the general formula:

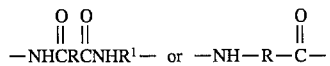

or a combination thereof in which R and $R^1$ are the same or different and are alkylene groups of at least about two carbon atoms, preferably alkylene groups having from about 2 to about 12 carbon atoms. Exemplary of such polyamides are polyamides formed by the reaction of diamines and diacids such as poly(hexamethylene adipamide) (nylon 6,6), poly(hexamethylene sebacamide) (nylon 6, 10), poly(heptamethylene pimelamide) (nylon 7,7), poly(octamethylene suberamide) (nylon 8,8), poly(nonamethylene azelamide) (nylon 9,9), poly(decamethylene azelamide) (nylon 10,9), and the like. Also illustrative of useful aliphatic polyamides are those formed by polymerization of amino acids and derivatives thereof, as for example lactams. Illustrative of these useful polyamides are poly(4-aminobutyric acid) (nylon 4), poly(6-aminohexanoic acid) (nylon 6, also known as poly(caprolactam)), poly(7-aminoheptanoic acid) (nylon 7), poly(8-aminoocatanoic acid)(nylon 8), poly(9-aminononanoic acid) (nylon 9), poly(10-aminodecanoic acid) (nylon 10), poly(11-aminoundecanoic acid) (nylon 11), poly(12-aminododecanoic acid) (nylon 12) and the like. Blends of two or more aliphatic polyamides may also be employed.

Copolymers formed from recurring units of the above referenced aliphatic polyamides can be used in the fabrication of layers 12 and 16. By way of illustration and not limitation, such aliphatic polyamide copolymers include caprolactam/hexamethylene adipamide copolymer (nylon 6/6,6), hexamethylene adipamide/caprolactam copolymer (nylon 6,6/6), trimethylene adipamide/hexamethylene azelaiamide copolymer (nylon trimethyl 6,2/6,2), hexamethylene adipamide/hexamethylene-azelaiamide/caprolactam copolymer (nylon 6,6/6,9/6) and the like.

Preferred aliphatic polyamides for use in the practice of this invention are poly(caprolactam) and poly(hexamethylene adipamide), with poly(caprolactam) being the most preferred.

Aliphatic polyamides used in the practice of this invention may be obtained from commercial sources or prepared in accordance with known preparatory techniques. For example, polycaprolactam can be obtained from AlliedSignal Inc The number average molecular weight of the polyamide may widely vary Usually, the aliphatic polyamide is of a "film-forming molecular weight", meaning a weight that is sufficiently high to form a free standing film but sufficiently low to allow melt processing of the blend into a film. Such number average molecular weights are well known to those of skill in the film forming art and are usually at least about 5,000 as determined by the formic acid viscosity method. In this method (ASTM D-789), a solution of 11 grams of aliphatic polyamide in 100 ml of 90% formic acid at 25° C. is used. In the preferred embodiments of the invention, the number average molecular weight of the aliphatic polyamide ranges between about 5,000 to about 100,000, and in the particularly preferred embodiments it ranges between about 10,000 to about 60,000. Most preferred are those in which the number average molecular weight of the aliphatic polyamide is from about 20,000 to about 40,000.

Interior layer 14 is formed of an "aliphatic/aromatic polyamide". As used herein, an "aliphatic/aromatic polyamide" is characterized by the presence of recurring carbon-amide groups as an integral part of the polymer chain where the carbonyl moieties are separated by aliphatic moieties having at least two carbon atoms and where the nitrogen groups are separated by aromatic moieties. Illustrative of these aliphatic/aromatic polyamides are those having recurring units of the formula:

which $R^2$ and $R^3$ are different and are alkylene group having at least 2 carbon atoms (preferably having from 2 to about 12 carbon atoms) or arylene (preferably substituted or unsubstituted phenylene, alkylenephenylene or dialkylenephenylene and wherein the aliphatic moieties have from 1 to about 7 carbon atoms wherein permissible substituents are alkyl, alkoxy or halo), with the proviso that when $R^2$ is arylene, $R^3$ is alkylene and when $R^2$ is alkylene, $R^3$ is arylene or dialkylene phenylene. Exemplary of such polyamides are poly(hexamethylene isophthalamide), poly (2,2,2-trimethyl hexamethylene terephthalamide), poly(m-xylylene adipamide) (MXD6), poly(p-xylylene adipamide), poly(hexamethylene terephthalamide), poly(dodecamethylene terephthalamide), and the like.

Blends of two or more aliphatic/aromatic polyamides can be used. Preferred aliphatic/aromatic polyamides for use in the fabrication of layer 14 are poly(hexamethylene isophthalamide), poly(2,2,2-trimethyl hexamethylene terephthalamide), poly(m-xylylene adipamide), poly(p-xylylene adipamide), poly(hexamethylene terephthalamide), and poly(dodecamethylene terephthalamide). More preferred aliphatic/aromatic polyamides are poly(2,2,2-trimethyl hexamethylene terephthalamide), poly(m-xylylene adipamide) [also known as poly(iminomethylene-1,3-phenylene iminoadipolylene)], poly(p-xylylene adipamide), and the most preferred aliphatic/aromatic polyamide is poly(iminomethylene-1,3-phenylene iminoadipolylene (again, also known as poly(m-xylyene adipamide) or MXD6).

Aliphatic/aromatic polyamides can be prepared by known preparative techniques or can be obtained from commercial sources. For example, such polyamides can be obtained from EMS Corporation under the tradename "Grivory G21" and from Mitsubishi Gas Chemical Company under the tradename "MXD6".

The number average molecular weight of the aliphatic/aromatic polyamide may vary widely. Usually, the aliphatic/aromatic polyamide is of a "film-forming molecular weight", again meaning a weight that is sufficiently high to form a free standing film and sufficiently low to allow melt processing of the blend into a film Such number average molecular weights are well known to those of skill in the film forming art and are usually at least about 5,000 as determined by the formic acid viscosity method described above. In the preferred embodiments of the invention, the number average molecular weight of the aliphatic/aromatic polyamide is from about 5,000 to about 100,000, and in the particularly preferred embodiments is from about 10,000 to about 60,000. Most preferred are those in which the number average molecular weight of the aliphatic/aromatic polyamide is from about 20,000 to about 40,000.

Figure 2:
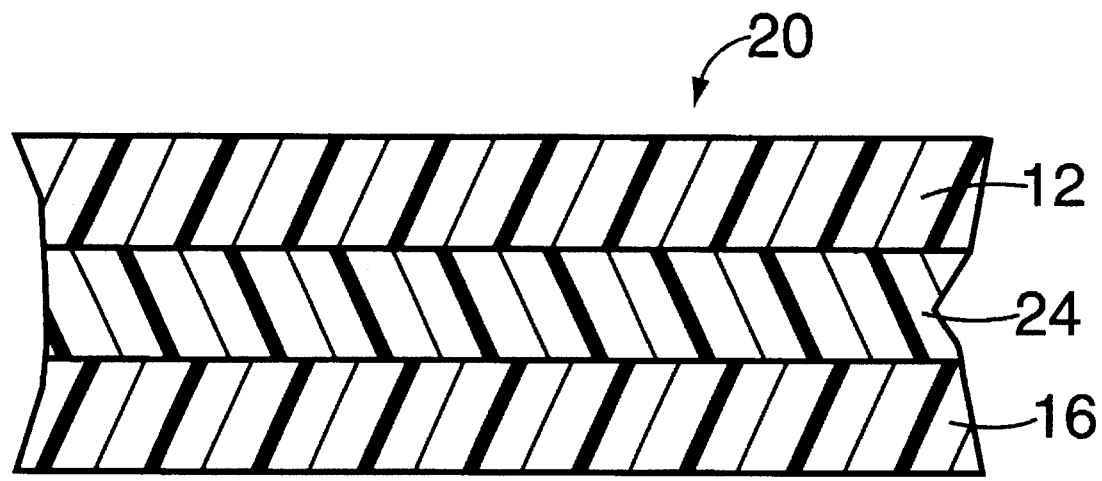
FIG. 2 is a cross-sectional view of a more preferred structure of this invention having three co-extruded layers, with the interior layer further comprised of a blend of two compounds.

As illustrated in FIG. 2, another co-extruded film 20 is shown which has a configuration comprised of three essential layers 12, 24, and 16. Layers 12 and 16 are formed from the aliphatic polyamides as previously described with respect to FIG. 1. Layer 24 includes a blend of an aliphatic/ aromatic polyamide and an ethylene-vinyl alcohol copolymer ("EVOH"). The film of this embodiment is not limited to the three essential layers, 12, 24, and 16, provided that layer 24 is positioned between layers 12 and 16. Thus, the film of this embodiment may also include any number of additional layers in any position as previously described with respect to FIG. 1. In the most preferred embodiment of this invention, the film includes only the three essential layers, 12, 24, and 16.

The aliphatic/aromatic polyamides suitable for use in layer 14 may also be used in the blend of layer 24. These aliphatic/aromatic polyamides also possess the same preferred film-forming molecular weights when considered independently from the blend.

The EVOH component in the blend of layer 24 has an ethylene content of between about 27 mole percent to about 48 mole percent, preferably between about 27 mole percent to about 44 mole percent, and most preferably between about 32 mole percent to about 38 mole percent. The EVOH component further has a density ranging between about 1.12 g/cm$^3$ to about 1.20 g/cm$^3$, preferably about 1.19 g/cm$^3$, and a melting temperature ranging between about 142° C. to about 191° C., preferably about 183° C. EVOH can be prepared by known preparative techniques or can be obtained from commercial sources. For example, such ethylene vinyl alcohol components can be obtained from Nippon Gohsei Company, Ltd. under the tradename "Soarnol DC".

About 50% to 95%, preferably 65% to 85% of the aliphatic/aromatic polyamide is mechanically blended, such as in a drum tumbler, with about 5% to 50%, preferably 15% to 35% of EVOH at room temperature for about 30 minutes. Most preferably, about 70% to 80% of the aliphatic/aromatic polyamide is mechanically blended with about 20% to 30% of EVOH. As used herein, all percentages are by weight unless otherwise indicated. Preferably, the aliphatic/aromatic polyamide is MXD6.

In addition to essential layers 12, 14 and 16 for film 10 and layers 12, 24, and 16 for film 20, the films may include one or more optional layers, provided that layer 14 is positioned between layers 12 and 16 in film 10 and layer 24 is positioned between layers 12 and 16 in film 20. Illustrative of such additional optional layers are polymeric layers formed of homopolymers and copolymers formed from α,β-unsaturated monomers, such as, for example, polyolefin homopolymers such as polyethylene and polypropylene, polyvinyl alcohol, ethylene/propylene copolymer, ethylene/ vinyl alcohol copolymer and blends thereof. Additional layers also include adhesive tie layers to tie various layers together. Non-limiting examples of other optional polymeric layers and adhesive or tie layers which can be used in the film laminate of the present invention are disclosed in U.S. Pat. Nos. 5,055,355; 3,510,464; 3,560,461; 3,847,845; 5,032,656; 3,585,177; 3,595,740; 4,284,674; 4,058,647; and 4,254,169.

The film of this invention can be formed by any conventional technique for forming films, including extrusion lamination and coextrusion. In the most preferred method, the film is formed by coextrusion.

For example, the material of the individual layers 12, 14 and 16 for film 10, as well as any optional layers, are fed into infeed hoppers of the extruders of like number, each extruder handling the material for one of the layers. Preferably the aliphatic polyamide is extruded into layers 12 and 16 from a single extruder, with the extrudate being split into the respective individual layers after it passes through both the single extruder and a feedblock co-extrusion adaptor, and then emerges from the co-extrusion die.

The melted and plasticated streams from the individual extruders are fed into a single manifold co-extrusion die. While in the die, the layers are juxtaposed and combined, then emerge from the die as a single multiple layer film of polymeric material. After exiting the die, the film is cast onto a first controlled temperature casting roll, passes around the first roll, and thence onto a second controlled temperature roll, which is normally cooler than the first roll. The controlled temperature rolls largely control the rate of cooling of the film after it exits the die. In a preferred embodiment of this invention where layers 12 and 16 are polycaprolactam and layer 14 is MXD6, typical operating temperatures for the first and second controlled temperatures rolls are approximately 190° F. (88° C.) and 220° F. (104° C.), respectively.

The same process is applicable to layers 12, :24, and 16 of film 20. Most preferably where layers 12 and 16 are caprolactam and layer 24 is a MXD6/EVOH blend, the typical operating temperatures for the first and second controlled temperatures rolls are also approximately 190° F. (88° C.) and 220° F. (104° C.), respectively.

In another method, the film forming apparatus may be one which is referred to in the art as a "blown film" apparatus and includes a multi-manifold circular die head for bubble blown film through which the plasticized film composition is forced and formed into a film "bubble". The "bubble" is ultimately collapsed and formed into a film.

Processes of coextrusion to form film and sheet laminates are generally known. See for example in "Modern Plastics Encyclopedia", Vol. 56, No. 10A, pp. 131–132, McGraw Hill, October 1979 and "Trends & Equipment . . . Coextrusion" by "M.H. Naitove in Plastics Technology, February, 1977, pp. 61–71, which are hereby incorporated by reference.

The films of this invention may be of any thickness desired and include those which have thicknesses typically less than about 20 mils (500 μm). Preferably, the films have a thickness of from about 0.1 mil (3 μm) to about 10 mils (250 μm); more preferably the films have a thickness of from about 0.4 mil (10 μm) to about 5 mils (130 μm), and most preferably the films have thickness of from about 0.5 mil (12.5 μm) to about 2 mils (50 μm). While such thicknesses are preferred as providing a readily flexible film, it is to be understood that other film thicknesses may be produced to satisfy a particular need and yet fall within the scope of the present invention.

The films of this invention may optionally be stretched or oriented in any direction if so desired using methods known to those of skill in the art. In such a stretching operation, the film may be stretched in either: 1) the direction coincident with the direction of movement of the film being withdrawn from the casting roll, also referred to in the an as the "machine direction"; 2) the direction which is perpendicular to the machine direction, and referred to in the art as the "transverse direction" where the resulting film is "uniaxially" oriented; or 3) the machine direction as well as in the transverse direction, where the resulting film is "biaxially" oriented. Typically for use in the present invention, the oriented film formed from the composition of the invention are preferably produced at draw ratios of from about 1.5:1 to about 6:1, and preferably at a draw ratio of from about 1.5:1 to about 4:1. The term "draw ratio" as used herein indicates the increase of dimension in the direction of the draw. Therefore, a film having a draw ratio of 2:1 has its length doubled during the drawing process. Generally, the film is drawn by passing it over a series of preheating and heating rolls. The heated film moves through a set of nip rolls downstream at a faster rate than the film entering the nip rolls at an upstream location. The change of rate is compensated for by stretching in the film.

Typical process and range of conditions for monoaxially oriented polyamide films are disclosed, for example, in U.S. Pat. No. 4,362,385. The film laminate of the present invention can be biaxially oriented using blown tube apparatus, or a tenter frame apparatus, and can either be sequentially or simultaneously oriented biaxially. The film laminate of the present invention can also be embossed after orientation.

The films of this invention can be used for any purpose for which films can be used. One noteworthy characteristic of the films of this invention is that they exhibit excellent gas barrier properties, particularly oxygen barrier properties, at 90% relative humidity (RH). Oxygen barrier resistance may be measured using a film having a gauge of 0.60 mils and the procedure of ASTM D-3985 using an OX-Tran 1050 cell manufactured by Modem Controls Inc. operated at 23° C.

In general, using the aforesaid method, the films of this invention have an oxygen transmission rate ($O_2TR$) at 90% RH equal to or less than about 0.5 cm$^3$/100 in$^2$/24 hrs/Atm at 23° C. The superior oxygen barrier properties of the films of this invention makes them especially useful in food packaging applications.

Another noteworthy characteristic of the films of the present invention is its ability to withstanding retorting. Retorting, as used herein, is defined as a process used to kill bacteria in which a material is subjected to higher temperature conditions, typically between 119° C. and 123° C., than those typically employed for sterilization or pasteurization.

The retortable properties of the films of the present invention were tested by manufacturing an article, such as a pouch or a lid for a container, comprised of a layer of the film of the present invention sandwiched between an interior layer of polypropylene and an exterior layer of polyester. The article was sealed, then placed into an autoclave or other pressurized chamber at approximately 119° C. to about 123° C. for approximately 30 minutes. While in this chamber, the article undergoes the retorting process with the steam present therein. The films of the present invention displayed superior retortable properties, as determined by their ability to retain their original optical appearance and structural integrity.

In practical use, for example, a film with superior retortable properties is especially useful in packaging applications for food which needs to be sterilized and/or which will subsequently be heated for a "heat and serve" product. Typically, the food is placed into the pouch or container, such that the food contacts the polypropylene layer of the pouch or lid, respectfully, and the pouch or container is then sterilized. Such a sealed pouch or container often is in a form suitable for subsequent heating or cooking by the consumer.

Several examples are set forth below to illustrate the nature of the invention and the manner of carrying it out. However, the invention should not be considered as being limited to the details thereof.

EXAMPLE I

A co-extruded film was made from poly(epsiloncaprolactam) [nylon 6] layers sandwiching an interior layer formed of poly(iminomethylene-1,3-phenylene iminoadipolylene) (MXD6). The nylon 6 had a relative formic acid viscosity of 73 and had a melt index of 0.7 g per 10 minutes at a load of 325 kg. at 275° C. (condition K). MXD6 was produced by Mitsubishi Gas Chemical Company of Japan. MXD6 was in pellet form and had a melt index of 4.0 g per 10 minutes as measured per the ASTM Test No. D1238 at a load of 325 kg at 275° C. (condition K). The MXD6 and the nylon 6 were co-extruded to form a three layer co-extruded film. The nylon 6 was extruded through a 3½ inch (88.9 mm) diameter Davis Standard Extruder having a temperature profile of Zone 1-510° F., Zone 2-510° F., Zone 3-510° F., Zone 4-495° F., Zone 5-495° F. and adapter Zone 1-490° F., corresponding respectively to temperatures of 266°, 266°, 266°, 257°, 257°, and 254° C. The extruder operated with a screw speed of 25 to 30 rpm, a motor drive amperage of 25 amps, a barrel pressure of 1000 psig (6.99×10$^3$ kPa), a melt temperature of the nylon at 490° F. (254° C.), and an extruder output of 120 pounds per hour (54.43 kg/hr).

The MXD6 was extruded through a 2 inch (50.8 mm) diameter Wellex extruder. The extruder had a temperature profile which included Zone 1-485° F., Zone 2-480° F., and Zone 3-490° F. and adapter Zone 1-485° F., corresponding to temperatures of 252°, 249°, 254°, and 252° C. respectively. The operating conditions of the extruder included a screw speed of 100 rpm, a motor drive amperage of 10 to 15 amps, a melt temperature of 461° F. (238° C.), and an extruder output of 60 pounds per hour (27.22 kg/hr).

The extrudate from the two extruders was fed through a feed block coextrusion adaptor manufactured by the Johnson Plastic Corporation and operating at an adaptor temperature of Zone 1—about 500° to 525° F., and Zone 2—about 500°–525° F. (corresponding to about 260° to 274° C.). The flat cast die temperatures were operated at about 500° F. (260° C.). The coextruded film was then cast on a roll at a temperature of about 190° F. (88° C.) and a rotation speed of 40 feet/min (12.19 m/min), followed by a cooling roll at a temperature of about 220° F. (104° C.) and a rotation speed of 42 feet/min (12.80 m/min). The total extrusion output was 180 pounds per hour (81.65 kg/hr) and the line speed was about 130 feet per minute (39.62 m/min).

The film was oriented monoaxially. The film was passed to a slow stretch roll at a temperature of about 260° F. (127° C.) and a rotation speed of about 44 feet/min (13.41 m/min), and to a fast stretch roll at a temperature of about 250° F. (121° C.) and a rotation speed of 132 feet/min (40.23 m/min), and then to a heat set roll at a temperature of about 200° F. (93° C.) and a rotation speed of 132 feet/min (40.23 m/min). The line speed was 180 feet per minute (54.86 m/min) and the draw ratio was 3.2:1. Two films, "Film 1" and "Film 2", were fabricated. Film 1 had an average gauge of 1.138 mils and Film 2 had an average gauge of 1.110 mils. The films and other physical characteristics are set forth in the following Table I.

TABLE I

| | FILM AND VALUE | | | |
| --- | --- | --- | --- | --- |
| | FILM 1 | | FILM 2 | |
| PROPERTY | MD[1] | TD[2] | MD | TD |
| Tensile, Modulus, psi (kPa) | 440200 (3.04 × 10$^6$) | 424100 (2.92 × 10$^6$) | 314900 (2.17 × 10$^6$) | 325300 (2.24 × 10$^6$) |
| Yield, psi (kPa) | — | 10670 (7.34 × 10$^4$) | — | 8423 (5.81 × 10$^4$) |
| Yield Elong % | — | 6.424 | — | 7.435 |
| Strength, psi (kPa) | 36790 (2.53 × 10$^5$) | 7080 (4.88 × 10$^4$) | 29760 (2.05 × 10$^5$) | 12940 (8.92 × 10$^4$) |

TABLE I-continued

| | FILM AND VALUE | | | |
|---|---|---|---|---|
| | FILM 1 | | FILM 2 | |
| PROPERTY | MD[1] | TD[2] | MD | TD |
| Elongation % | 63.05 | 270.8 | 86.27 | 425.2 |
| Tear, Elmendorf gms/layer | 48.0 | >1600 | 19.2 | >1600 |
| Tear, Graves gms/mil | 630.7 | 1167.0 | 472.1 | 1025.0 |
| Dimensional Stability 350° F., 10 Min. | −6.3 | −1.9 | −6.6 | −1.7 |
| | −6.7 | −2.4 | −6.9 | −2.0 |
| | −6.7 | −2.1 | −6.8 | −1.8 |

[1]MD = machine direction
[2]TD = transverse direction

EXAMPLE II

A series of experiments were carried out to test the oxygen permeability of the film laminates of this invention prepared in Example I. The films were tested for oxygen permeability using the Ox-Tran 1050 cell manufactured by Modern Controls, Inc., Elk River, Minn. and operated at 23° C. The procedure used was that disclosed in ASTM D-3985. The oxygen permeability was measured in cubic centimeters per 100 inch square per 24 hours per Atm at 23° C. and 90% relative humidity.

The results are set forth in the following Table II.

TABLE II

| FILM | $O_2$TR (90% RH) |
|---|---|
| Film 1 | 0.4270 |
| Film 2 | 0.4800 |

It can be said that Films 1 and 2 have excellent oxygen barrier properties.

EXAMPLE III

A three layer co-extruded structure was made from two nylon 6 layers, sandwiching an interior layer formed of a blend of 75 weight percent MXD6 and 25 weight percent of EVOH. The MXD6 and EVOH were previously preblended in a drum tumbler at room temperature for approximately 30 minutes.

The nylon 6, which was produced by AlliedSignal Inc., had a relative formic acid viscosity of 73 and a melt index of 0.7 g per 10 minutes at a load of 325 kg. at 275° C. (condition K). The MXD6, which was produced by Mitsubishi Gas Chemical Company of Japan, was in pellet form and had a melt index of 4.0 g per 10 minutes as measured per the ASTM Test No. D1238 at a load of 325 kg at 275° C. (condition K). The EVOH, which was produced by Nippon Gohsei Company, Ltd. of Japan under the tradename "Soarnol DC 3203", had an ethylene content of 32 molecular percent, a density of 1.19 g/cm$^3$ and a melting temperature of 183° C.

The MXD6/EVOH blend layer and the two layers of nylon 6 were co-extruded to form a three layer co-extruded film such that the blend layer was in between the two layers of nylon 6. The nylon 6 layers were extruded through a 3½ inch (88.9 mm) diameter Davis Standard Extruder having a temperature profile of Zone 1-510° F., Zone 2-510° F., Zone 3-510° F., Zone 4 -495° F., Zone 5- 495° F. and adapter Zone 1-490° F., corresponding respectively to temperatures of 266°, 266°, 266°, 257°, 257°, and 254° C. The extruder operated with a screw speed of 25 to 30 rpm, a motor drive amperage of 25 amps, a barrel pressure of 1000 psig (6.99×10$^3$ kPa), a melt temperature of the nylon at 490° F. (254° C.), and an extruder output of 120 pounds per hour (54.43 kg/hr).

The MXD6/EVOH blend layer was extruded through a 2 inch (50.8 mm) diameter Wellex extruder. The extruder had a temperature profile which included Zone 1-485° F., Zone 2-480° F., and Zone 3-490° F. and adapter Zone 1- 485° F., corresponding to temperatures of 252°, 249°, 254°, and 252° C. respectively. The operating conditions of the extruder included a screw speed of 100 rpm, a motor drive amperage of 10 to 15 amps, a melt temperature of 513° F. (267° C.), and an extruder output of 60 pounds per hour (27.22 kg/hr).

The extrudate from the two extruders was fed through a feed block coextrusion adaptor manufactured by the Johnson Plastic Corporation and operating at an adaptor temperature of Zone 1—about 500° to 525° F., and Zone 2—about 500°–525° F. (corresponding to about 260° to 274° C.). The flat cast die temperatures were operated at about 500° F. (260° C.). The coextruded film was then cast on a roll at a temperature of about 190° F. (88° C.) and a rotation speed of 40 feet/min (12.19 m/min), followed by a preheat roll at a temperature of about 220° F. (104° C.) and a rotation speed of 42 feet/min (12.8 m/min). The total extrusion output was 180 pounds per hour (81.65 kg/hr) and the line speed was about 130 feet per minute (39.62 m/min).

The film was oriented monoaxially. The film was passed to a slow stretch roll at a temperature of about 260° F. (127° C.) and a rotation speed of 44 feet/min (13.41 m/min), and to a fast stretch roll at a temperature of about 250° F. (121° C.) and a rotation speed of about 132 feet/min (40.23 m/min), and then to a heat set roll at a temperature of about 200° F. (93° C.) and a rotation speed of about 132 feet/min (40.23 m/min). The line speed was 132 feet per minute (40.23 m/min) and the draw ratio was 3.2:1. Two films, "Film 3" and "Film 4", were fabricated Film 3 had an average gauge of 1.082 mils and Film 4 had an average gauge of 1.078 mils. The films and other physical characteristics are set forth in the following Table III.

TABLE III

| | FILM AND VALUE | | | |
|---|---|---|---|---|
| | FILM 3 | | FILM 4 | |
| PROPERTY | MD[1] | TD[2] | MD | TD |
| Tensile, Modulus, psi (kPa) | 424400 (2.93 × 10$^6$) | 412300 (2.84 × 10$^6$) | 373900 (2.58 × 10$^6$) | 327300 (2.26 × 10$^6$) |
| Yield, psi (kPa) | — | 10320 (7.12 × 10$^4$) | — | 8301 (5.72 × 10$^4$) |
| Yield Elong % | — | 7.555 | — | 7.254 |
| Strength, psi (kPa) | 32580 (2.24 × 10$^5$) | 6938 (4.78 × 10$^4$) | 33840 (2.33 × 10$^5$) | 13510 (9.32 × 10$^4$) |
| Elongation % | 84.07 | 235.4 | 100.7 | 411.9 |
| Tear, Elmendorf gms/layer | 25.6 | >1600 | 17.6 | >1600 |
| Tear, Graves gms/mil | 652.6 | 1117.0 | 453.8 | 1056.0 |
| Dimensional Stability 350° F., 10 Min. | −6.6 | −2.2 | −6.4 | −1.9 |
| | −6.7 | −2.2 | −6.5 | −2.4 |
| | −6.8 | −2.0 | −6.3 | −2.0 |

[1]MD = machine direction
[2]TD = transverse direction

EXAMPLE IV

A series of experiments were carried out to test the oxygen permeability of the film laminates of this invention prepared in Example III. The films were tested for oxygen permeability using the methods as described in Example II.

The results are set forth in the following Table IV.

TABLE IV

| FILM | $O_2TR$ (90% RH) |
|---|---|
| Film 3 | 0.3189 |
| Film 4 | 0.2835 |

It can be said that Films 3 and 4 also have excellent oxygen barrier properties.

The films produced in Examples I and III were subjected to a standard retorting process at temperatures of about 250° F. (121° C.) for approximately 30 minutes. Both films retained their original optical appearance and structural integrity.

Thus, it can be seen that the addition of MXD6 to a polyamide-layered composition improves its gas impermeability characteristics.

Moreover, due to EVOH's inability to withstand moisture and thus its "non-retortable" characteristics, it would be expected that if a greater than nominal amount of EVOH were added to the polyamide-MXD6 composition, the composition would degrade during the retortability tests. However, as demonstrated by Examples III and IV, the addition of a significant amount of EVOH to the interior layer of MXD6 further improved the composition's overall oxygen impermeability characteristics without reducing its retortability characteristics or physical properties. Thus, the EVOH becomes retortable, while the gas impermeability characteristics of the MXD6 is enhanced.

It can be seen that the present invention provides excellent physical and oxygen barrier properties, as well as exhibits enhanced heat resistant properties to withstand the rigors of retorting conditions.

What is claimed is:

1. A retortable film having at least three layers comprised of:
   a) two aliphatic polyamide layers; and
   b) an interior layer of a blend of an aliphatic/aromatic polyamide and an ethylene vinyl alcohol copolymer,
   wherein said interior layer is positioned between said two aliphatic polyamide layers and said aliphatic/aromatic polyamide has a glass transition temperature of less than or equal to 85° C.

2. A film according to claim 1 wherein said aliphatic polyamide is selected from the group consisting of polyamides having recurring monomeric units of the formula:

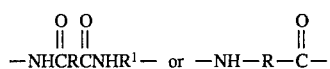

or combination thereof wherein:

R and $R^1$ are the same or different and are alkylene having at least about 2 carbon atoms.

3. A film according to claim 2 wherein R and $R^1$ are the same or different and are alkylene having from 2 to about 12 carbon atoms.

4. A film according to claim 3 wherein said aliphatic polyamide is selected from the group consisting of poly(hexamethylene adipamide), poly(4-aminobutyric acid), poly(caprolactam), poly(7-aminoheptanoic acid), caprolactam/hexamethylene adipamide copolymer, and hexamethylene adipamide/caprolactam copolymer.

5. A film according to claim 3 wherein said aliphatic polyamide is poly(caprolactam), poly(hexamethylene adipamide) or a combination thereof.

6. A film according to claim 3 wherein said aliphatic polyamide is poly( caprolactam).

7. A film according to claim 1 wherein said aliphatic/aromatic polyamide is selected from the group consisting of polyamides having recurring units of the formula:

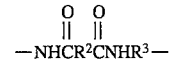

wherein $R^2$ and $R^3$ are different and are alkylene having at least about 2 carbon atoms or arylene, with the proviso that when $R^2$ is arylene, $R^3$ is alkylene and that when $R^2$ is alkylene, $R^3$ is arylene or dialkylene phenylene.

8. A film according to claim 7 wherein:

$R^2$ and $R^3$ are different and are alkylene having from 2 to about 12 carbon atoms; or substituted or unsubstituted phenylene, alkylenephenylene or dialkylene phenylene, wherein permissible substituents are alkyl, alkoxy or halo and wherein the alkyl or alkoxy substituents have from 1 to about 7 carbon atoms.

9. A film according to claim 8 wherein:

$R^2$ and $R^3$ are different and are alkylene having from 2 to about 12 carbon atoms or unsubstituted phenylene, alkylenephenylene or dialkylene phenylene wherein the alkylene moieties have from 1 to about 3 carbon atoms.

10. A film according to claim 9 wherein said aliphatic/aromatic polyamide is selected from the group consisting of poly(2,2,2-trimethyl hexamethylene terephthalamide), poly(m-xylylene adipamide), poly(p-xylylene adipamide), poly(hexamethylene isophthalamide), poly(hexamethylene terephthalamide) and poly(dodecamethylene terephthalamide).

11. A film according to claim 1 wherein said aliphatic/aromatic polyamide in said interior layer is poly(m-xylylene adipamide).

12. A film according to claim 1 having an oxygen permeability at 90% relative humidity equal to or less than about 0.5 cm³/100 in²/Atm when measured according to ASTM D-3985.

13. A film according to claim 1, wherein said interior layer is comprised of a blend of poly(m-xylylene adipamide) and ethylene vinyl alcohol copolymer.

14. A film according to claim 13, wherein said blend is comprised of about 50% to 95% poly(m-xylylene adipamide) and about 5% to 50% ethylene vinyl alcohol copolymer by weight.

15. A film according to claim 14; wherein said blend is comprised of about 70% to 80% poly(m-xylylene adipamide) and about 20% to 30% ethylene vinyl alcohol copolymer by weight.

16. A film according to claim 1 wherein:

said aliphatic polyamide is selected from the group consisting of poly(caprolactam), poly(hexamethylene adipamide) and caprolactam/hexamethylene adipamide copolymer; and said interior layer is a blend of poly(m-xylylene adipamide) and ethylene vinyl alcohol copolymer, said film having an oxygen permeability at 90% relative humidity equal to or less than about 0.3 cm³/100 in²/24 hrs./Atm when measured according to ASTM D-3985.

17. A film according to claim 16 wherein said aliphatic polyamide is poly(caprolactam).

18. A film according to claim 17 wherein said blend is comprised of about 70% to 80% of poly(m-xylylene adipamide) and about 20% to 30% by weight of ethylene vinyl alcohol copolymer.

19. A retortable film having at least three layers comprised of
   a) two aliphatic polyamide layers; and
   b) an interior layer consisting of a blend of an aliphatic/aromatic polyamide and an ethylene vinyl alcohol copolymer, wherein said interior layer is positioned between said two aliphatic polyamide layers and said aliphatic/aromatic polyamide has a glass transition temperature of less than or equal to 85° C.

20. A retortable film having at least three layers comprised of:
   a) two layers of an aliphatic polyamide selected from the group consisting of poly(caprolactam), poly(hexamethylene adipamide) and caprolactam/hexamethylene adipamide copolymer; and
   b) an interior layer comprised of a blend of poly(m-xylylene adipamide) and ethylene vinyl alcohol copolymer, said film having an oxygen permeability at 90% relative humidity equal to or less than about 0.3 $cm^3$/100 $in^2$/24 hrs/Atm when measured according to ASTM D-3985.

* * * * *